(No Model.)
T. B. PEACOCK.
MAIL INDICATOR AND ADVERTISING BOARD.
No. 440,961. Patented Nov. 18, 1890.
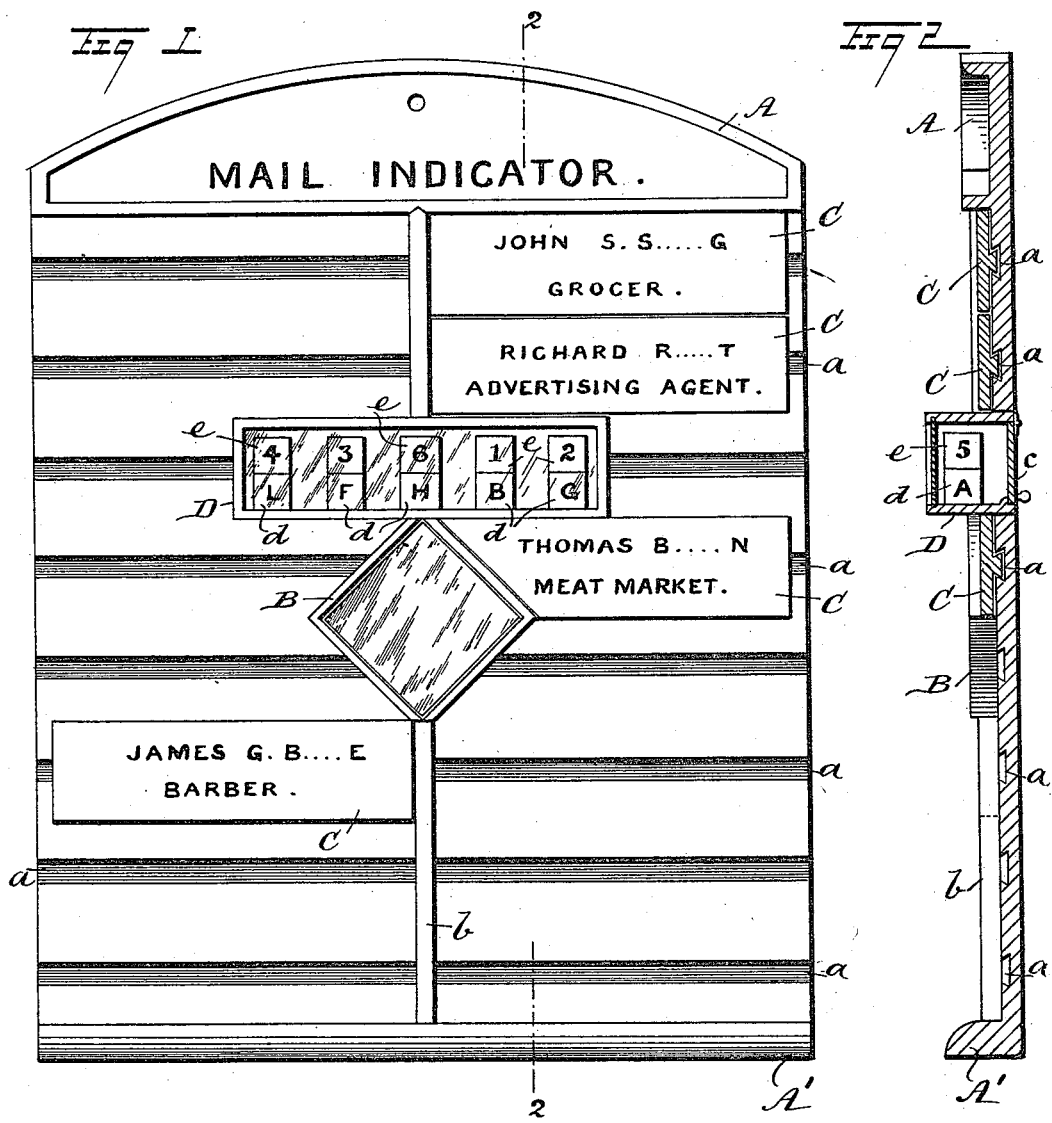
WITNESSES:
H. Walker
C. Sedgwick
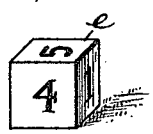
INVENTOR:
T. B. Peacock
BY
Munn & Co.
ATTORNEYS

United States Patent Office.

THOMAS B. PEACOCK, OF TOPEKA, KANSAS.

MAIL-INDICATOR AND ADVERTISING-BOARD.

SPECIFICATION forming part of Letters Patent No. 440,961, dated November 18, 1890.

Application filed July 9, 1890. Serial No. 358,158. (No model.)

*To all whom it may concern:*

Be it known that I, THOMAS B. PEACOCK, of Topeka, in the county of Shawnee and State of Kansas, have invented a new and useful Mail-Indicator and Advertising-Board, of which the following is a full, clear, and exact description.

The objects of this invention are to provide a mail-indicator of a novel form, and in the same device furnish convenient means for conspicuously displaying business or other advertisements.

To these ends my invention consists in certain features of construction and combinations of parts herein described and claimed.

Reference is to be had to the accompanying drawings, forming a part of this specification, in which similar letters of reference indicate corresponding parts in all the figures.

Figure 1 is a front elevation of the device. Fig. 2 is a side elevation in section, taken on the line 2 2 in Fig. 1; and Figs. 3 and 4 represent enlarged cubes used in the indication of mail.

The board A is preferably made of wood, rectangular at its lower corners and having an arched top piece. At any desired point on the front face of the board A the mirror B is secured. As shown, the mirror is located near the center. Its size should be proportioned to the area of the advertising-space on the board, so that it will not take up too much room, yet serve its purpose as a public convenience.

The board A is of sufficient thickness to permit the formation in it of a series of horizontal grooves $a$, which are evenly spaced apart. These grooves may be undercut on their opposite edges, as shown in Fig. 2, or formed in any other suitable manner, so as to adapt them to retain in place several slides C, that are each provided with a projecting rib which corresponds in shape to that of the grooves it may engage.

The length of the slides C is proportioned to the entire width of the board A, so that two aligning slides may be located in a groove. Preferably the series of grooves $a$ is vertically divided by a central vertical parting-strip $b$, against which the several slides will abut when they are slid into place on the board A.

On the slides C any desired business-card, advertisement, or graphic delineation may be placed permanently or temporarily, and, as the slides are interchangeable, such display cards or signs may be alternated in position on the face of the board, so as to attract attention to them; or the advertisement on each card may be altered as frequently as desired, from the fact that the slides whereon they are placed can be removed to facilitate such a change.

At any suitable point on the board A an elongated rectangular box D is introduced into a slot cut in the material of the board, said box having a glazed front wall and a door at its rear side, as shown in Fig. 2 at $c;$ or, if preferred, the door may be hinged to the front side of the box. In either case there must be a transparent front of glass provided for the conspicuous exposure of the contents of the box. A number of cubical blocks $d$ of equal size are provided, which are of such relative dimensions to the capacity of the box D that at least five such blocks may be located within the box in a row, resting on the lower surface of the same.

Upon the several faces of the cubical blocks $d$ letters of the alphabet are formed, preferably in consecutive order, a different letter being placed on each side of each block, so that the entire alphabet will be contained on the five blocks provided.

Another series of blocks $e$, of equal size with the blocks $d$, is preferably employed in connection with said lettered blocks. The cubical blocks $e$, being equal in number with the blocks $d$, are furnished with numbers from 1 upward, a different number being placed on each side of each block up to and including 6—that is to say, the blocks are duplicates of each other, the indicating number on each side of a block increasing in value from 1 to 6, inclusive.

The board A may be set on its base A' or hung up, and, if it is convenient, the suspension of the board should be upon a partition that divides the clerks' department in the post-office from the public corridor or room wherein mail recipients are admitted. If the board is hung upon a division-wall, as just stated, there may be a wicket or opening formed in the partition, so that the door $c$ may be opened and the position of the cubes $d$ changed.

In use one of the clerical force of the office should ascertain by inspection the number of letters, papers, or packages having a certain initial for the surnames—as, for instance, A—that are awaiting delivery. The letter A on the proper cube should then be turned front to expose it for public inspection, and the same process should be observed with other letters that have a different initial to the surnames on them. Should the business of the post-office require it, there should be a sufficient number of blocks $d$ provided to show all the letters of the alphabet at once. The number of letters that are awaiting delivery for each surname may be indicated by placing a cube $e$ with the proper figure exposed to the front upon the cube $d$ that designates the initial of the surname, so that the number of letters bearing said initial letter will be shown to the public, as represented in Fig. 1.

While it is not claimed for this device that it precisely indicates to each individual who expects mail that a letter or other mail-matter is ready for delivery to him, it facilitates business and saves time by the information conveyed, as, where the office is thronged with applicants for mail, any person by a glance at the mail-indicating board will see if there are letters having the initial of surnames similar to his own. If there is not such a letter shown on the cubes $d$, time will be saved, as the party is thus notified that he or she cannot expect mail at that time.

Having thus described my invention, I claim as new and desire to secure by Letters Patent—

1. A mail-indicator and advertising-board comprised of a board having movable slides that contain advertisements exposed, and further provided with a box-like receptacle having a transparent front wall and a series of cubes having alphabetical letters on their faces, which cubes are loosely adjustable in the box, substantially as set forth.

2. A mail-indicator and advertising-board comprised of an elongated board having parallel side edges, a series of movable slides having advertisements on their exposed faces, a box embedded in the board intermediate of the slides and provided with a transparent front wall, and a series of cubical blocks having different letters on their faces, which blocks, when arranged in the box, are adapted to indicate undelivered mail, substantially as set forth.

THOMAS B. PEACOCK.

Witnesses:
W. S. JOHNSON,
J. L. REYNOLDS.